(12) United States Patent
Guilford et al.

(10) Patent No.: US 9,844,079 B1
(45) Date of Patent: Dec. 12, 2017

(54) METHOD AND SYSTEM OF TRIGGERING SIGNAL ANALYSIS COMBINING TIME AND FREQUENCY DOMAIN TRIGGER CRITERIA

(75) Inventors: John H. Guilford, Stanwood, WA (US); Jay M. Wardle, Seattle, WA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 2177 days.

(21) Appl. No.: 12/913,231

(22) Filed: Oct. 27, 2010

(51) Int. Cl.
*H04B 1/38* (2015.01)
*H04W 76/00* (2009.01)

(52) U.S. Cl.
CPC .................. *H04W 76/005* (2013.01)

(58) Field of Classification Search
CPC ........... H04B 17/004–17/008; H03J 7/18–7/32
USPC ........... 455/90.2, 161.1–169.2, 171.1, 181.1, 455/226.1–226.4, 227–231
See application file for complete search history.

(56) References Cited

U.S. PATENT DOCUMENTS

| | | | | |
|---|---|---|---|---|
| 4,385,398 A * | 5/1983 | Wycoff | ............... | H04W 88/027 340/13.27 |
| 6,377,617 B1 | 4/2002 | Nara | | |
| 6,434,186 B2 * | 8/2002 | Dowling | ............... | H04W 48/16 375/147 |
| 7,333,467 B2 * | 2/2008 | Kuehnle | ................ | G04R 20/10 368/47 |
| 7,729,457 B2 * | 6/2010 | Bochkovskiy et al. | ........................ | G01S 19/21 342/357.63 |
| 2002/0072341 A1 * | 6/2002 | Ricard | .................... | G10L 25/78 455/174.1 |
| 2003/0017832 A1 * | 1/2003 | Anderson | ............. | H04W 64/00 455/456.1 |
| 2003/0198304 A1 * | 10/2003 | Sugar | .................... | H04W 16/14 375/340 |
| 2004/0208239 A1 * | 10/2004 | Karlsson | ................... | H04K 3/82 375/219 |
| 2005/0102449 A1 * | 5/2005 | Durston | ................. | G01R 31/11 710/36 |
| 2007/0019714 A1 * | 1/2007 | Bochkovskiy | .......... | G01S 19/21 375/150 |
| 2007/0058695 A1 * | 3/2007 | Cheng | ..................... | G01S 19/30 375/148 |
| 2008/0070532 A1 * | 3/2008 | Moffatt | ................ | H04B 17/318 455/226.1 |
| 2008/0101320 A1 * | 5/2008 | Krahn | ................... | H04W 74/04 370/342 |

(Continued)

*Primary Examiner* — Edward Urban
*Assistant Examiner* — Rui Hu

(57) ABSTRACT

A signal analyzer comprises: a first tuner configured to tune to a first frequency band and to output first tuner data; a memory device configured to store the first tuner data; a spectrum calculator configured to calculate a series of spectra for the first tuner data; a processor configured to determine a presence of a transmission of interest within the first tuner data based on the series of spectra; a second tuner configured to receive the first tuner data stored in the memory device and to tune to a second frequency band including the transmission of interest. The second tuner outputs second tuner data in response to the stored first tuner data. The signal analyzer also comprises a transmission start time detector configured to receive the second tuner data and to determine a start time for the transmission of interest from the second tuner data.

18 Claims, 3 Drawing Sheets

(56) References Cited

U.S. PATENT DOCUMENTS

| | | | | |
|---|---|---|---|---|
| 2008/0102769 A1* | 5/2008 | Jerye | ................... | H03J 1/0083 |
| | | | | 455/161.1 |
| 2008/0117993 A1* | 5/2008 | Karlsson | ............... | H03J 1/0091 |
| | | | | 375/256 |
| 2010/0118921 A1* | 5/2010 | Abdelmonem et al. | ................... | H04B 1/1036 |
| | | | | 375/148 |

* cited by examiner

METHOD AND SYSTEM OF TRIGGERING SIGNAL ANALYSIS COMBINING TIME AND FREQUENCY DOMAIN TRIGGER CRITERIA

BACKGROUND

In order to capture or analyze signal transmissions, it is often necessary to locate the transmission in time and frequency. In some cases, the time and frequency of the transmission are known for the signal. In other cases neither the time nor the frequency of the transmission is known a priori. For example, FIG. 1 illustrates a signal analyzer 110 operating in the presence of a plurality of signal transmitters 120, where neither the time nor the frequency of a transmission is known in advance. Illustratively, the signal transmitters 120 are push-to-talk (PTT) marine radios that transmit signals sporadically and, during extended periods of time, do not transmit signals. Because the time of commencement of signal transmissions and the frequencies of the signal transmissions are not known, in order for signal analyzer 110 to capture and analyze an entire signal transmission from one of the signal transmitters 120, the signal analyzer 110 must locate the time and frequencies of the signal transmission. This can impose significant processing demands on a processor in signal analyzer 110.

It would be desirable to provide an efficient means of triggering signal analysis on signal transmissions when neither the frequency nor the time of the signal transmission is known in advance.

SUMMARY

In a representative embodiment a signal analyzer comprises: a first tuner configured to tune to a first frequency band and to output first tuner data; a memory device configured to store the first tuner data; a spectrum calculator configured to calculate a series of spectra for the first tuner data; a processor configured to determine a presence of a transmission of interest within the first tuner data based on the series of spectra; a second tuner configured to receive the first tuner data stored in the memory device and to tune to a second frequency band including the transmission of interest. The second tuner outputs second tuner data in response to the stored first tuner data. The signal analyzer also comprises a transmission start time detector configured to receive the second tuner data and to determine a start time for the transmission of interest from the second tuner data.

In another representative embodiment, a method comprises: tuning a first tuner to a first frequency band and outputting first tuner data from the first tuner; storing the first tuner data in a memory device; calculating a series of spectra for the first tuner data; determining a presence of a transmission of interest within the first tuner data based on series of spectra; tuning a second tuner to a second frequency band including a frequency of the transmission of interest; providing the first tuner data from the memory device to the second tuner, and in response thereto outputting second tuner data; and determining a start time for the transmission of interest from the second tuner data.

BRIEF DESCRIPTION OF THE DRAWINGS

The representative embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be provided or coupled to a device, this encompasses cases where one or more intermediate devices may be employed to provide or couple the signal to the device. However, when a signal is said to be directly provided or coupled to a device, this encompasses only cases where the signal is directly provided coupled to the device without any intermediate or intervening devices.

To provide an efficient means of triggering signal analysis on transmissions when neither the frequency nor the time of the transmission is known in advance, embodiments of a two pass triggering arrangement are disclosed herein where the first pass locates a transmission of interest in frequency (at the expense of time resolution) while the second pass locates the start of the transmission of interest in time.

Figure 1:
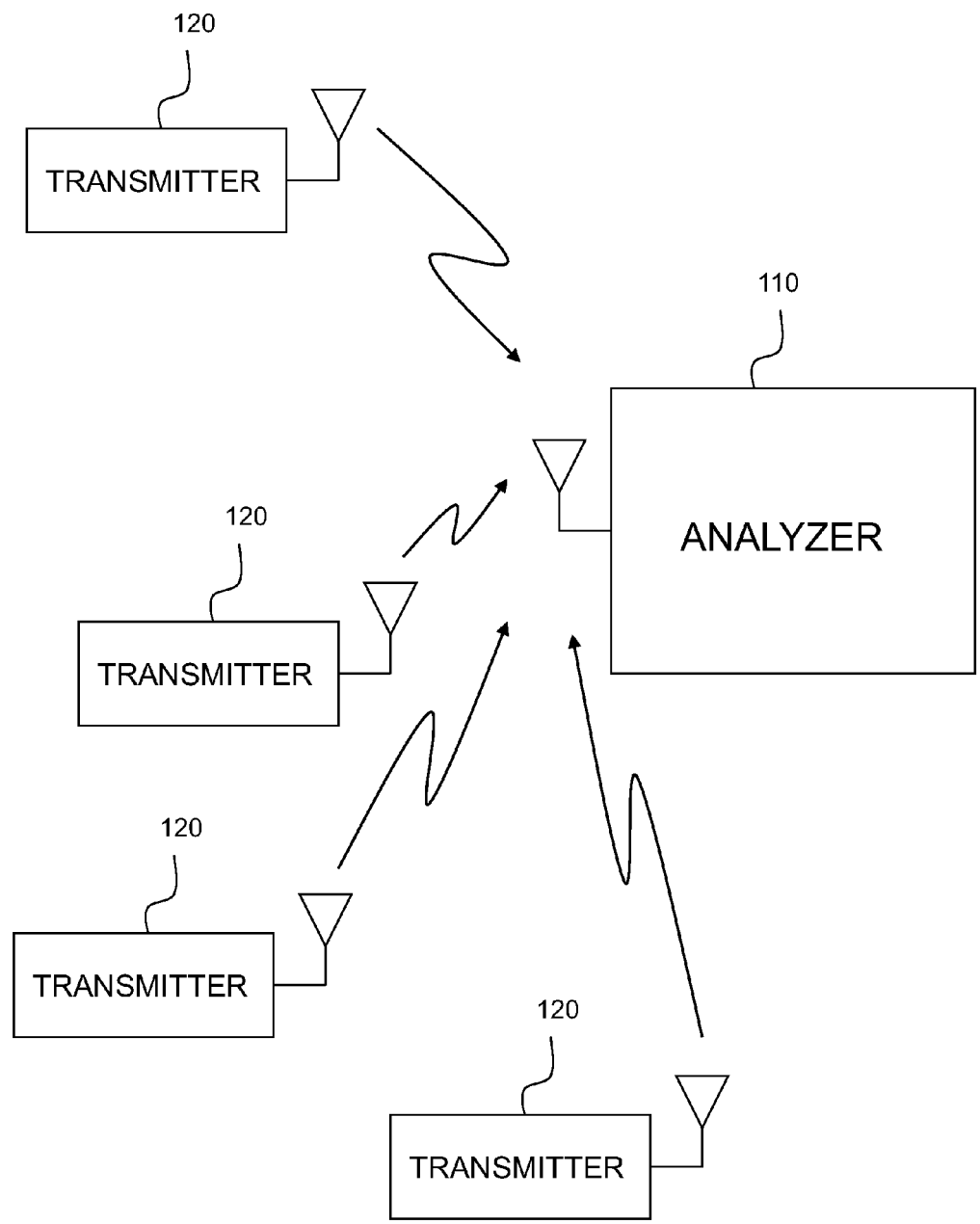
FIG. 1 illustrates an example of a signal analyzer operating in the presence of a plurality of transmitters.
Figure 2:
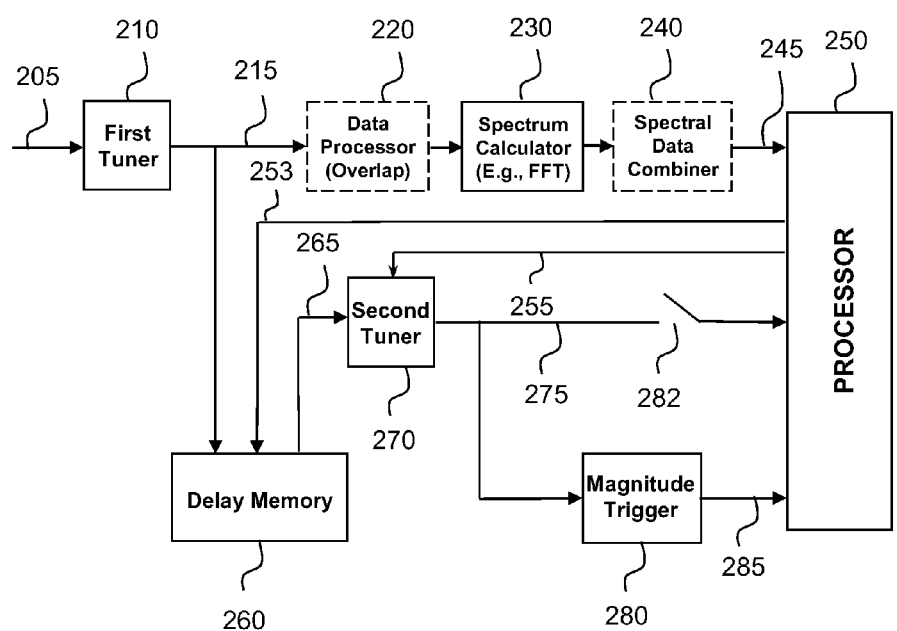
FIG. 2 illustrates portions of one embodiment of a signal analyzer that employs a trigger that combines time and frequency domain triggering criteria.

FIG. 2 illustrates portions of one embodiment of a signal analyzer 200 that employs a trigger that combines time and frequency domain triggering criteria. Signal analyzer 200 includes: a first tuner 210, a data processor 220, a spectrum calculator 230, a spectral data combiner 240, a processor 250, a memory device 260, a second tuner 270, a magnitude trigger 280, and an optional switch 282. The signal analyzer 200 also comprises many other components that are not required for an understanding of the present teachings. Such components may be found in a variety of signal analyzers commercially available for example from Agilent Technologies, Santa Clara, Calif. USA.

In some embodiments, first and second tuners 210 and 270 are each configured to perform a tune-and-zoom operation wherein they may be tuned to a desired center frequency and their bandwidth adjusted or "zoomed" to a desired bandwidth.

First tuner 210 is configured to receive input data 205 and to output first tuner data 215.

In some embodiments, data processor 220 is configured to overlap the first tuner data 215 for a subsequent spectrum calculation by spectrum calculator 230. In some embodiments, data processor 220 and the overlap function may be omitted.

Spectrum calculator 230 is configured to calculate a series of spectra for first tuner data 215, for example using overlapped first tuner data from data processor 220. In some embodiments, spectrum calculator 230 is configured to perform a Fast Fourier Transform (FFT) for first tuner data 215.

In various embodiments, spectral data combiner 240 is configured to process the series of spectra calculated by spectrum calculator 230 to perform: an averaging operation, a peak hold operation, or a combining operation, on the series of spectra. The spectral data combiner then provides spectral data 245 to the processor 250.

In some embodiments, processor 250 includes a general purpose digital microprocessor executing one or more software algorithms in response to computer instructions stored in an associated memory device. In some embodiments, processor 250 includes one or more dedicated hardware components, which may include a field programmable gate array (FPGA) and/or an application specific integrated circuit (ASIC).

In some embodiments, memory device 260 is configured to continuously receive first tuner data 215 and to store a record of first tuner data 215 for a desired length of time. In some embodiments, as older first tuner data 215 reaches a maximum retention time in memory device 260, it is replaced with more recent first tuner data 215.

Second tuner 270 is configured to receive stored first tuner data 265 from memory device 260 and in response thereto to output second tuner data 275.

Magnitude trigger 280 is configured to operate as a transmission start time detector, being configured to receive second tuner data 275 and to compare second tuner data 275 to a magnitude threshold or other trigger criteria. In response to the comparison of second tuner data 275 to the magnitude threshold (or other trigger criteria) the magnitude trigger 280 is configured to output a trigger signal 285. In some embodiments, magnitude trigger 280 may be omitted and its function as a transmission start time detector may be accomplished by processor 250.

Figure 3:
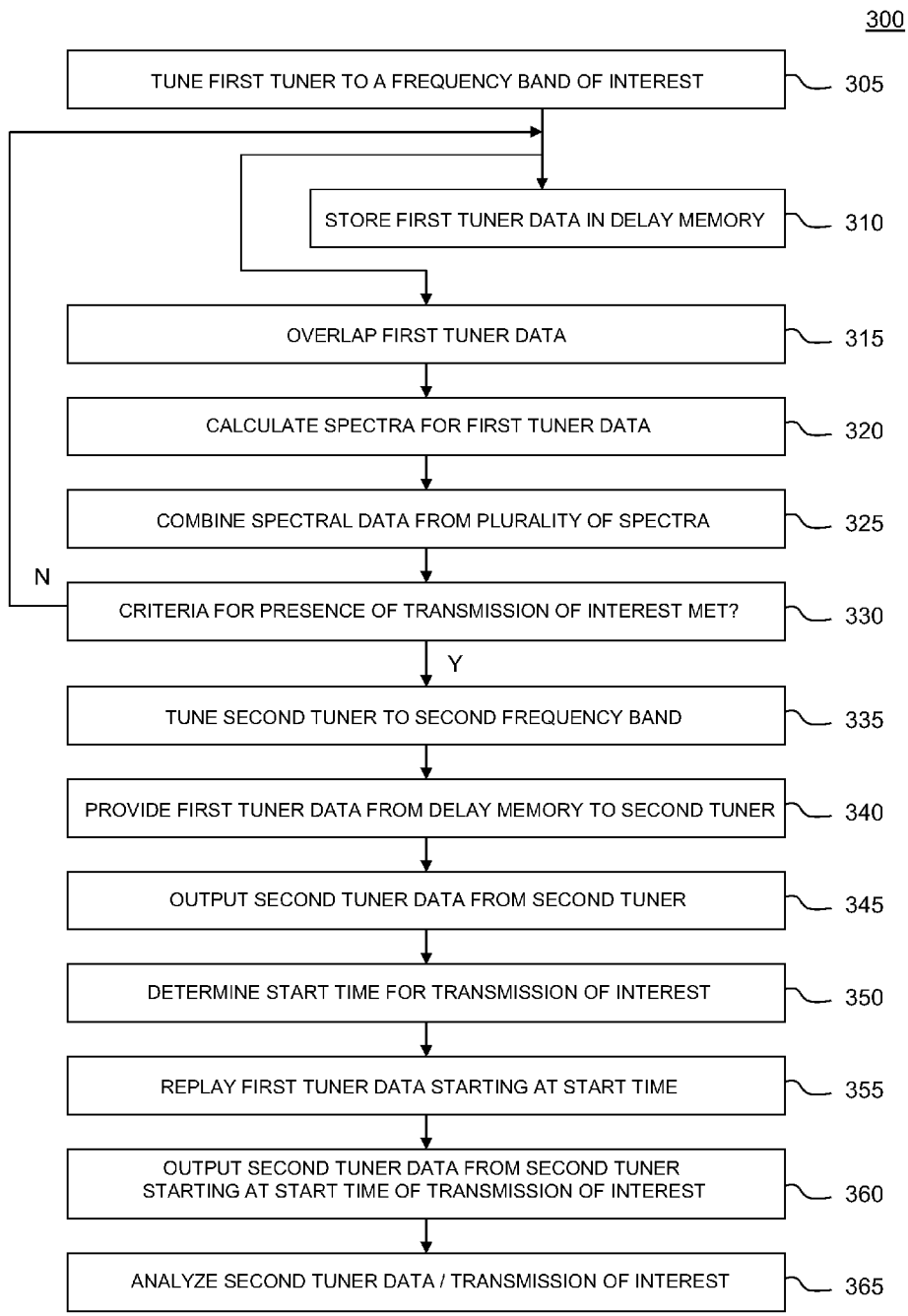
FIG. 3 illustrates one embodiment of a method of signal analysis that includes generating a trigger signal by combining time and frequency domain triggering criteria.

FIG. 3 illustrates one embodiment of a method 300 of signal analysis that includes generating a trigger signal by combining time and frequency domain triggering criteria.

Method 300 may be performed with signal analyzer 200 and will be described herein with respect to signal analyzer 200.

In a first step 305, first tuner 210 is "tuned-and-zoomed" to a desired first frequency band of interest (i.e., a desired center frequency and frequency bandwidth). For example, in a case where signal analyzer 200 is analyzing transmissions that may be transmitted at various unknown times and on various unknown frequencies or channels within a marine radio band, first tuner 210 may be tuned to the center of the marine radio band and may have a bandwidth that includes all of the channels (or channels of interest) in the marine radio band. Thus the first frequency band of first tuner 210 may have a relatively wide bandwidth when compared to the bandwidth of a particular transmission of interest. In response to input data 205 in the first frequency band, first tuner 210 outputs first tuner data 215.

In a step 310, first tuner data 215 is provided to, and stored in, memory device 260.

Meanwhile, in a step 315, data processor 220 overlaps first tuner data 215 and outputs the overlapped first tuner data to spectrum calculator 230. In some embodiments, step 315 may be omitted, in which case first tuner data 215 may be provided from first tuner 210 directly to spectrum calculator 230.

In a step 320, spectrum calculator 230 calculates a series of spectra for first tuner data 215, which may have been overlapped first in step 315. In some embodiments, spectrum calculator 230 performs a Fast Fourier Transform (FFT) for first tuner data 215.

In a step 325, spectral data combiner 240 combines the calculated series of spectra generated by spectrum calculator 230 and provides spectral data 245 to processor 250. In various embodiments, spectral data combiner 240 is configured to process the series of spectra calculated by spectrum calculator 230 by performing an averaging operation, a peak hold operation, or a combining operation on the series of spectra. In some embodiments, step 325 may be omitted, in which case spectral data 245 may be provided from spectrum calculator 230 directly to processor 250.

In a step 330, processor 250 determines from the calculated series of spectra whether one or more criteria are met indicating the presence of a transmission of interest within first tuner data 215, and therefore within the first frequency band to which first tuner 210 is tuned. One or more criteria may be employed for ascertaining the presence of a transmission of interest within first tuner data 215, including for example and without limitation any one or combination of: the average or peak spectral magnitude being greater than a predefined threshold; a change in the average or peak spectral magnitude being greater than a predefined threshold; one or more local spectral maxima being greater than a predefined threshold; and a bandwidth of frequencies within the spectra having a peak or average spectral magnitude that is greater than a predefined threshold.

When a transmission of interest is identified, then processor 250 may identify one or more frequency(ies) or channel(s) where the transmission of interest is found, including for example a center frequency and a frequency span or bandwidth of the transmission of interest.

When the one or more criteria for identifying a transmission of interest is/are not met, then the process continues at steps 310 and 315 and repeats.

When the one or more criteria for identifying a transmission of interest is/are met, then in a step 335 second tuner 270 is tuned to a second frequency band that includes or spans the frequencies where the transmission of interest was identified by processor 250. In some embodiments, the second frequency band is substantially narrower than the first frequency band that is processed by first tuner 210. In some embodiments, the second frequency band may be centered on a center frequency of the transmission of interest. Furthermore, the bandwidth of the second frequency band may be selected to be the same as, or slightly greater than, the frequency span or bandwidth of the transmission of interest. In some embodiments, processor 250 provides a control signal 255 to "tune and zoom" second tuner 270 to the desired second frequency band based on its identification of the transmission of interest as described above. For example, in the case where signal analyzer 200 is analyzing transmissions that may be transmitted at various unknown times and on various unknown frequencies or channels in a marine radio band, second tuner 270 may be tuned to the particular channel in the marine radio band where processor 250 identified the transmission of interest. Thus second tuner 270 may be tuned to a relatively narrow second frequency band compared to the relatively wide first frequency band of first tuner 210.

In a step 340, memory device 260 provides stored first tuner data 265 to second tuner 270.

In a step 345, in response to stored first tuner data 265 from memory device 260, second tuner 270 outputs second tuner data 275.

In a step 350, a start time for the transmission of interest is determined from second tuner data 275.

For example, in a case where the transmission of interest is a transmission from a marine radio that may be sporadically initiated in response to a push-to-talk switch, there may be a long period of time where the marine radio does not transmit any transmissions of interest, and then in response to keying the push-to-talk switch, the marine radio may initiate a transmission of interest on an unknown frequency or channel within the marine radio band. In that case, as described above in steps 305-330, signal analyzer 200 identifies the transmission of interest and its associated frequency or channel. Then in steps 335-350, the start time for that transmission of interest is identified.

In some embodiments, the start time for the transmission of interest is determined by magnitude trigger 280, which receives second tuner data 275, compares second tuner data 275 to one or more trigger criteria (e.g., a magnitude threshold), and outputs a trigger signal 285 to processor 250 indicating the start time for the transmission of interest. That is, in these embodiments the transmission start time detector comprises magnitude trigger 280.

In some embodiments, a separate magnitude trigger 280 may be omitted from signal analyzer 200, in which case processor 250 may receive second tuner data 275 from second tuner 270 and the processor 250 may determine the start time for the transmission of interest from second tuner data 275. That is, in these embodiments the transmission start time detector comprises processor 250.

As described above with respect to steps 305-350, signal analyzer 200 may produce a trigger signal 285 that combines time and frequency domain triggering criteria. In some embodiments, during steps 305-350 optional switch 282 in signal analyzer 200 may remain open.

In response to trigger signal 285, signal analyzer 200, and in particular processor 250, may then tailor the signal analysis to the portion of the stored first tuner data 265 where the transmission of interest is located, both in frequency (spectrum) and in time.

Toward that end, in a step 355 memory device 260 replays a portion of the stored first tuner data 265 beginning at a selected memory location, or memory address, corresponding to the start time for the transmission for interest. In various embodiments, the selected memory location may be a memory location for stored first tuner data 265 that was produced at the start time for the transmission of interest, or a memory location for stored first tuner data 265 that was produced a predetermined short time interval prior to the start time for the transmission of interest. The selected memory location may be selected by processor 250. In some embodiments, processor 250 provides a memory control signal 253, for example an address signal, that indicates the selected memory location in memory device 260 (corresponding to a particular reception time) from which memory device 260 should begin replaying or outputting the portion of stored first tuner data 265. In some embodiments, depending upon the nature of the transmission of interest, after a transmission of interest is located in time and frequency, processor 250 may add a selected delay to the start time for the transmission of interest in order to determine the selected memory location from which memory device 260 should begin replaying or outputting the portion of stored first tuner data 265. One example of when processor 250 may add a selected delay to the start time is when the transmission of interest is generated by a push-to-talk (PTT) radio where the transmission might be only a carrier wave (CW) signal momentarily (e.g., one second), until a user begins speaking into a microphone. This initial CW signal may be uninteresting for some signal analysis applications, in which case processor 250 may delay the start of the signal analysis from the start time of the transmission of interest until a time when the speech is expected to begin, (e.g., several hundred milliseconds).

With second tuner 270 tuned to the second frequency band (e.g., a relatively narrow second frequency band, as described above) including the frequency(ies) where the transmission of interest was identified by processor 250, and with memory device 260 replaying the stored first tuner data 265 beginning from a selected memory location, or corresponding reception time, selected by processor 250, then in step 360 second tuner 270 outputs a portion of the second tuner data 275 corresponding to the transmission of interest. When optional switch 282 is present, it is closed during step 360 and the corresponding portion of the second tuner data 275 is provided to processor 250.

In a step 365, processor 250 performs a signal analysis on the portion of the second tuner data 275 corresponding to the transmission of interest.

Variations are possible with respect to the embodiments of a signal analyzer 200 and a method 300 as described above. For example, in some embodiments, processor 250 could incorporate the overlapping, spectrum calculation, and the spectra combining functions of signal analyzer 200 if processor 250 has sufficient processing bandwidth to support these additional functions.

As described above, in various embodiments a signal analyzer employs two pass triggering arrangement where the first pass locates a transmission of interest in frequency (at the expense of time resolution) while the second pass locates the start of the transmission of interest in time. By this arrangement, processing requirements for determining the frequency of a transmission of interest can be reduced, while still maintaining an accurate determination of the time that the transmission of interest was received.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A signal analyzer, comprising:
   a first tuner configured to tune to a first frequency band and to output first tuner data;
   a memory device configured to store the first tuner data;
   a spectrum calculator configured to calculate a series of spectra for the first tuner data;
   a processor configured to determine when a transmission of interest is present within the first tuner data based on the series of spectra;
   a second tuner configured to receive the first tuner data stored in the memory device and to tune to a second frequency band including the transmission of interest, wherein the second tuner outputs second tuner data in response to the first tuner data; and
   a transmission start time detector configured to receive the second tuner data and to determine a start time for the transmission of interest from the second tuner data, wherein the transmission start time detector comprises a magnitude trigger configured to receive the second tuner data and to compare the second tuner data to one or more trigger criteria.

2. The signal analyzer of claim 1, wherein in response to a comparison of the second tuner data with the one or more trigger criteria, the transmission start time detector is configured to output a trigger signal to the processor indicating the start time for the transmission of interest.

3. The signal analyzer of claim 2, wherein the processor is configured to respond to the trigger signal to cause the memory device to replay to the second tuner a portion of the first tuner data stored in the memory device beginning at a selected memory location corresponding to the start time for the transmission of interest, and to receive a portion of the second tuner data corresponding to the transmission of interest.

4. The signal analyzer of claim 3, wherein the processor is further configured to perform a signal analysis on the portion of the second tuner data corresponding to the transmission of interest.

5. The signal analyzer of claim 1, wherein the transmission start time detector comprises the processor.

6. The signal analyzer of claim 1, further comprising a data processor configured to overlap the first tuner data and to provide the overlapped first tuner data to the spectrum calculator.

7. The signal analyzer of claim 1, further comprising a spectral data combiner configured to perform at least one of an averaging operation, a peak hold operation, and a combining operation on the series of spectra.

8. The signal analyzer of claim 1, wherein the processor comprises a general purpose digital microprocessor executing a software algorithm.

9. The signal analyzer of claim 1, wherein the processor comprises one of a programmable gate array and an application specific integrated circuit.

10. A method, comprising:
tuning a first tuner to a first frequency band and outputting first tuner data from the first tuner;
storing the first tuner data in a memory device;
calculating a series of spectra for the first tuner data;
determining when a transmission of interest is present within the first tuner data based on the series of spectra;
tuning a second tuner to a second frequency band including a frequency of the transmission of interest;
providing the first tuner data from the memory device to the second tuner, and in response thereto outputting second tuner data;
determining a start time for the transmission of interest from the second tuner data;
overlapping the first tuner data to provide overlapped first tuner data; and
calculating the series of spectra from the overlapped first tuner data.

11. The method of claim 10, further comprising performing at least one of an averaging operation, a peak hold operation, and a combining operation on the series of spectra.

12. The method of claim 10, wherein determining a start time for the transmission of interest from the second tuner data comprises comparing the second tuner data to one or more trigger criteria.

13. The method of claim 12, further comprising in response to comparing the second tuner data to the one or more trigger criteria, outputting a trigger signal indicating the start time for the transmission of interest.

14. The method of claim 10, further comprising generating a trigger signal indicating the start time for the transmission of interest.

15. The method of claim 14, further comprising, in response to the trigger signal, causing the memory device to provide to the second tuner a portion of the first tuner data stored in the memory device beginning at a selected memory location corresponding to the start time for the transmission of interest, and to output from the second tuner a portion of the second tuner data corresponding to the transmission of interest.

16. The method of claim 15, further comprising performing a signal analysis on the portion of the second tuner data corresponding to the transmission of interest.

17. The method of claim 14, further comprising in response to the trigger signal, causing the memory device to provide to the second tuner a portion of the first tuner data stored in the memory device beginning at a selected memory location corresponding to a selected delay after the start time for the transmission of interest, and to output from the second tuner a portion of the second tuner data corresponding to the transmission of interest.

18. The method of claim 17, further comprising performing a signal analysis on the portion of the second tuner data corresponding to the transmission of interest.

* * * * *